United States Patent [19]

Wood

[11] 3,875,730

[45] Apr. 8, 1975

[54] CONVEYOR CONTROL MECHANISM FOR AGRICULTURAL STACK-FORMING IMPLEMENT

[75] Inventor: William Robert Wood, Ankeny, Iowa

[73] Assignee: Deere & Company, Moline, Ill.

[22] Filed: June 20, 1973

[21] Appl. No.: 371,733

[52] U.S. Cl. .................................. 56/344; 56/351
[51] Int. Cl. ............................................ A01d 85/00
[58] Field of Search ................... 56/341, 344–361, 56/364

[56] References Cited
UNITED STATES PATENTS
3,691,741   9/1972   White et al. .......................... 56/344
3,744,228   7/1973   Lundahl ............................... 56/344
3,748,840   7/1973   Kanengieter et al. ................ 156/341

*Primary Examiner*—Robert Peshock
*Assistant Examiner*—J. N. Eskovitz

[57] ABSTRACT

An agricultural stack-forming implement of the type having a mobile frame adapted to be towed behind a tractor, a crop-receiving container mounted on the frame, the container including a rear door movable into and out of closing relationship with an opening in the rear thereof and further including a power driven floor conveyor for moving a completed stack of crop material rearwardly from the container through the opening, and power driven crop pickup and delivery means on the frame forwardly of the container for picking crop material up off a field and delivering it rearwardly into the container, the pickup means being driven through a first power train from a power take-off shaft on the towing tractor, the implement including a clutch engageable in response to movement of the rear door of the container out of closing relationship with the opening to drivingly connect the floor conveyor to the power train for the crop pickup means.

6 Claims, 5 Drawing Figures

CONVEYOR CONTROL MECHANISM FOR AGRICULTURAL STACK-FORMING IMPLEMENT

BACKGROUND OF THE INVENTION

The present invention relates generally to mobile agricultural stack-forming machines and more particularly to apparatus for automatically engaging the stack discharge conveyor drive on such an implement in response to movement of the door on the container out of closing relationship with the crop outlet opening.

Agricultural stack-forming implements of the type having a mobile frame adapted to be pulled by a tractor, a crop-receiving container on the frame, and a pickup unit on the frame forwardly of the container for picking crop material up off a field and directing it rearwardly into the container are old and well known in the art. The crop-receiving container on such an implement is customarily provided with a door at the rear thereof which is normally closed during the stack-forming operation and is opened to permit removal of the completed stack from the container. Removal of the completed stack is effected by means of a conveyor associated with the floor of the container which is operative to convey the stack rearwardly through the opening which results when the door is moved to its opened position. During the stack-forming operation, of course, the conveyor remains in a stationary condition, and should be engaged only after the rear door has been opened. In the past, independent controls have been provided for opening the rear door and activating the floor conveyor, with the undesirable result that the conveyor could be engaged prior to the door being opened. Such an arrangement is further undesirable since it requires the operator to activate two separate controls.

SUMMARY OF THE INVENTION

It is, accordingly, a primary object of the present invention to provide a control mechanism for the floor conveyor on a stack-forming implement of the type described, which is operative to automatically engage the drive to the conveyor in response to movement of the rear door of the container from its closed to its opened position. More particularly, it is an object to provide such a control mechanism that is simple and reliable in operation.

In pursuance of these and other objects, the invention comprises, generally, an agricultural stack-forming implement of the type having a mobile frame adapted to be towed by a tractor, a crop container mounted on the frame, and a crop pickup and delivery unit mounted on the frame forwardly of the container for picking crop material up off a field and delivering the same rearwardly into the container. The container is provided with an opening in its rear side which is closed during the stack-forming operation by a door which is swingable to an opened position to permit rearward removal of the stack from the container through the opening. The stack is removed from the container by means of a conveyor associated with the floor thereof. The implement further includes a drive train on its forward end for driving the crop pickup and delivery unit from a power take-off shaft on the tractor used for towing the implement.

According to the invention, a control mechanism is provided for drivingly connecting the floor conveyor to the pickup unit drive train in response to movement of the rear door on the container from its closed to its opened position. The mechanism includes a second power train for transmitting power to the floor conveyor, a clutch engageable to drivingly connect the first and second power trains, the clutch being normally biased toward an engaged position, a clutch control member on the rear portion of the implement, and means connecting the clutch control member with the clutch for operating the latter in response to movement of the former. The clutch control member is engaged by the rear door and is held in a clutch disengaged position when the door is in its closed position, and is permitted to assume a clutch engaged position when the door is opened. The clutch comprises a pair of mating elements, one element being drivingly connected to each of the power trains, and one element being axially biased toward the other. The force of the clutch-biasing means is transmitted to the clutch control element by means of the connection therebetween, and is operative to bias the clutch control element against the door. As the door is initially moved from its closed position, the biasing force thus causes the control element to follow the door and thus move from its clutch disengaged to its clutch engaged position.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
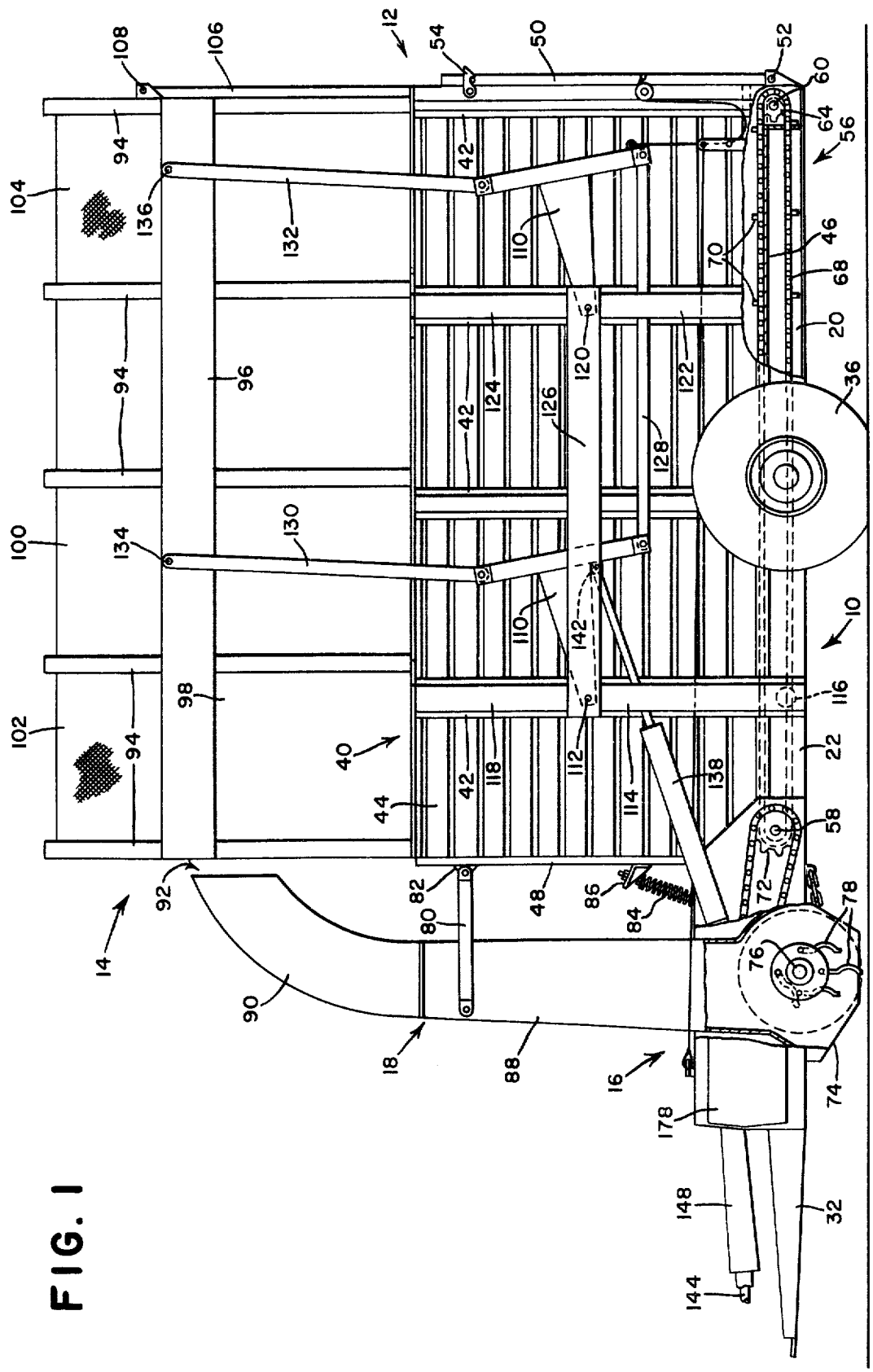
FIG. 1 is a left side elevational view of a stack-forming implement incorporating the features of the present invention, with portions broken away for the sake of clarity.

Referring now to the drawings, the stack-forming implement of the invention comprises, generally, a mobile frame 10 adapted to be towed by a tractor, a crop-receiving container 12 carried by the frame, a top 14 for the container 12 mounted on the latter for vertical reciprocable movement, the top being operative to compress material in the container, a material pickup and delivery unit 16 mounted on the frame forwardly of the container 12 and operative to pick material such as windrowed hay up off the ground and propel the same upwardly, and a material delivery spout 18 for directing the material from the pickup unit rearwardly into the container 12. Although an elevational view of the right side of the machine is not shown in the drawings, the machine is generally symmetrical about its longitudinal axis and the ensuing description of those elements on the left side of the machine will thus be analogously applicable to the right side of the machine unless otherwise indicated.

The frame 10 includes a pair of longitudinally extending, transversely spaced beams 20 and 22 on the right and left sides, respectively, of the implement, a pair of right and left channel members 24 and 26 which are fixed to and extend forwardly from the forward ends of the beams 20 and 22, respectively, a transverse channel member 28 that connects the forward ends of the members 24 and 26, and a transverse beam 30 that connects the extreme rearward ends of the beams 20 and 22. A triangular hitch structure 32 is fixed centrally to the transverse channel 28 and extends forwardly therefrom, the structure being adapted at its forward end for attachment to the drawbar of a conventional agricultural tractor. A pair of ground-engaging wheels 34 and 36 are rotatably mounted on the midportions of the beams 20 and 22, respectively, to support the frame relative to the ground.

Figure 5:
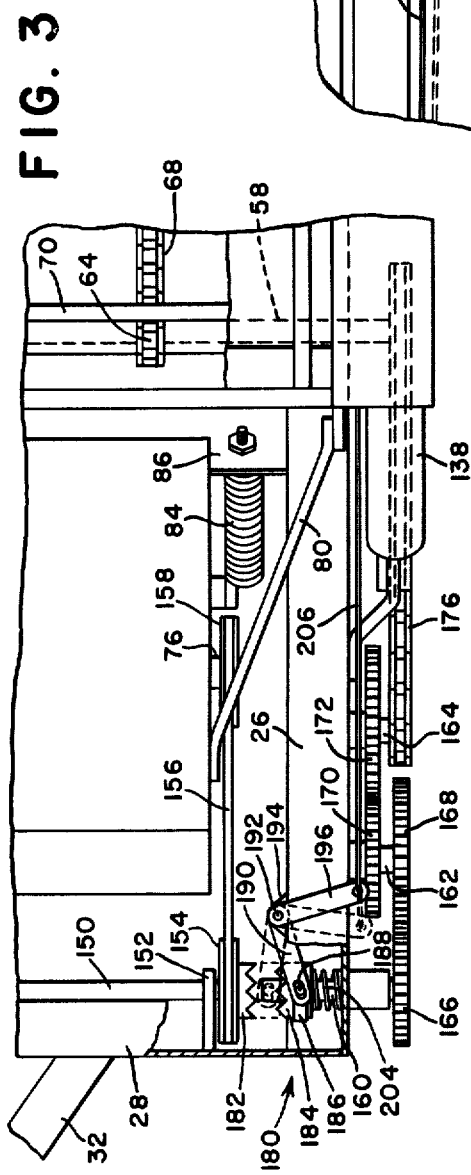
FIG. 5 is an enlarged fragmentary elevational view of a rear portion of the implement.

The container 12 is formed in part by a pair of vertically extending walls 38 and 40 on the right and left sides, respectively, of the implement. The left wall 40 of the container 12 includes a plurality of vertical support members 42 fixed at their lower ends to the longitudinal beam 22, and a rectangular, corrugated sheet metal section 44 secured to the upper side of the beam 22 and the inner sides of the supports 42. The container 12 further includes a horizontal floor 46 which extends transversely between the longitudinal beams 20 and 22, a front wall 48 which encloses the forward ends of the sides 38 and 40 and floor 46, and a rear door 50 which normally encloses the stack discharge opening at the rear of the container. The rear door 50 is pivotally connected at 52 to the container for vertical pivotal movement between a raised or closed position shown in FIG. 1 of the drawings and a lowered or opened position in which the outer end rests on the ground and the door acts as a ramp for unloading the completed stack from the container. The door is shown in dotted lines between its opened and closed positions in FIG. 5 of the drawings. A releasable latch member 54 normally maintains the door 50 in its closed position during the stack-forming process, and may be released by the operator to permit the door to move to its opened position, in a manner not material for purposes of the present invention and therefore not disclosed. Reference is made to copending U.S. application, Ser. No. 371,734, which illustrates a suitable operating mechanism for the latch 54.

Associated with the floor 46 of the crop container is a conveyor mechanism, designated generally by the numeral 56, which is operative to move a completed stack of crop material rearwardly from the container through the opening in the rear thereof and down the ramp formed by the door 50 when in its opened position. The conveyor 56 comprises a front and rear pair of parallel shafts 58 and 60, respectively, which extend transversely between and are rotatably supported at opposite ends by the longitudinal beams 20 and 22, a right and left pair of sprockets 62 and 64 contained on each of the shafts 58 and 60, a right and left pair of chains 66 and 68 which are drivingly trained around the sprockets 62 and 64, respectively, the upper runs of the chains passing above and the lower runs passing below the floor 46, and a plurality of transversely extending slats 70 which interconnect the chains 66 and 68 at longitudinally spaced intervals. In operation, the shafts 58 and 60 and chains 66 and 68 move in a clockwise direction as viewed in FIG. 1, so that the slats 70 move rearwardly along the upper surface of the floor 46. Power is supplied to a sprocket 72 on the extreme left end of the forward shaft 58 to drive the conveyor mechanism, through a drive train that will be subsequently described.

The crop pickup unit 16 is suspended on the frame for limited vertical movement through the rectangular opening defined by the longitudinal channel members 24 and 26, the transverse channel 28, and the front wall 48 of the container. The unit includes a housing 74 which is formed integrally with and at the lower end of the spout 18, a transverse shaft 76 supported at opposite ends in the sidewalls of the housing 74, and a plurality of crop pickup and propelling paddles 78 pivotally supported on the shaft 76. The upper end of the pickup unit and spout combination is supported on the crop container 12 by a pair of fore-and-aft extending arms 80 which are pivoted at their forward ends to the sides of the spout 18 and at their rear ends to brackets 82 fixed to the front wall 48. The lower end of the unit is supported on the frame for vertical adjustment in a manner not material to the present invention and therefore not fully disclosed. The lower support may take the form of the apparatus disclosed for this purpose in copending U.S. application, Ser. No. 344,712. A major portion of the weight of the pickup unit and spout is supported from the front wall of the container by a pair of springs 84 which connect the unit 16 with brackets 86 on opposite sides of the wall. The anchors for the springs include threaded rod and nut adjustment members for adjusting the amount of force exerted by the springs. The suspension mechanism for the pickup unit permits the unit to "float" vertically relative to the frame to conform to variations in the surface of the ground.

Figure 2:
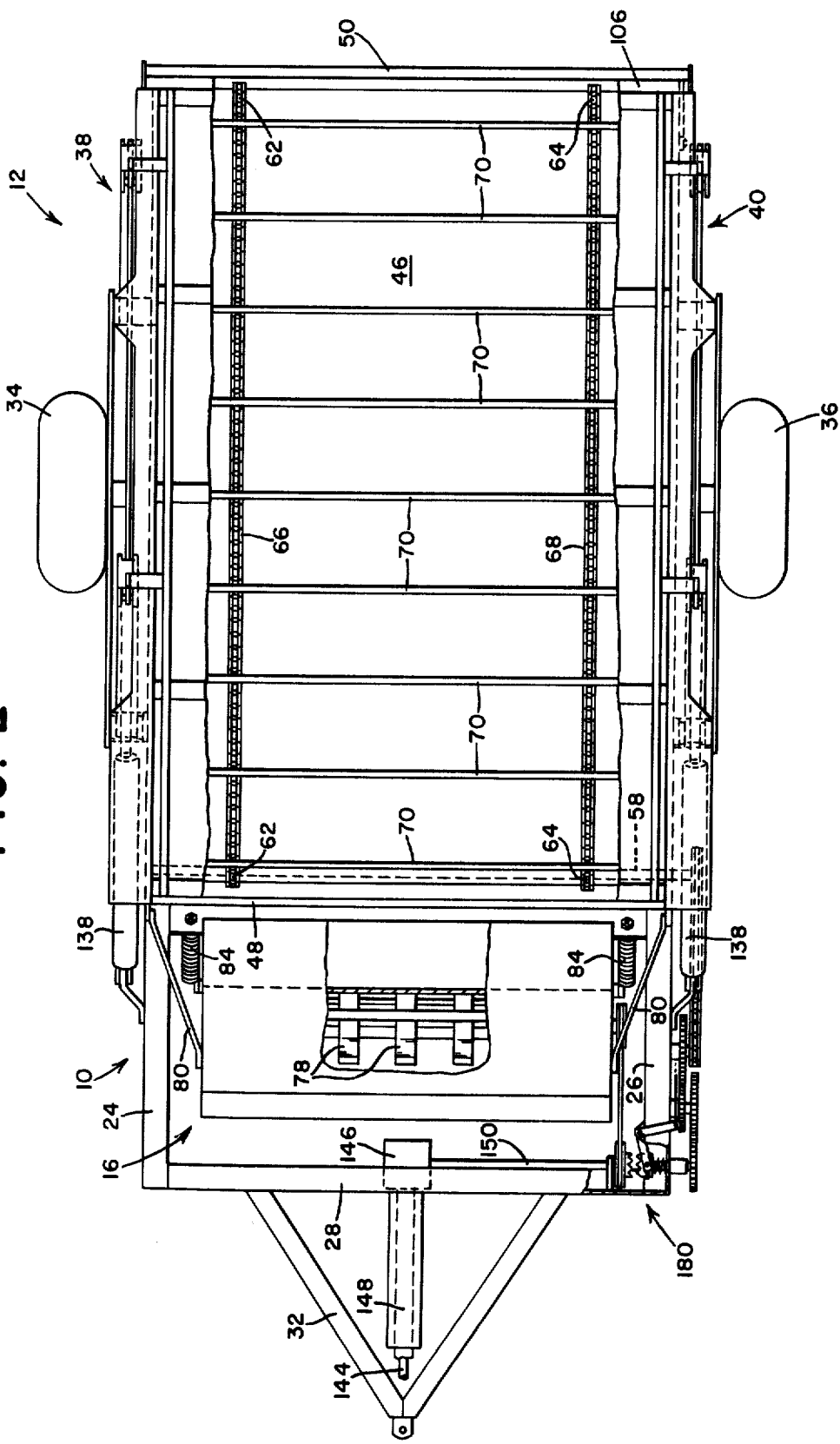
FIG. 2 is a plan view of the implement shown in FIG. 1, also having portions broken away to better illustrate the invention.

The spout 18 has a generally vertical lower portion 88 communicating at its lower end with the pickup unit housing 74, and an arcuate upper portion 90 terminating in a rearwardly directed discharge opening 92. In operation, power is supplied to the pickup unit shaft 76 through a drive train that will be subsequently described, to drive the shaft in a clockwise direction as viewed in FIG. 1 and thereby cause the paddles 78 to extend radially outwardly from the center of the shaft and define the cylinder shown in dotted lines in FIG. 2. As the paddles rotate in the manner described, they engage crop material lying on the ground, such as windrowed alfalfa or the like, and propel it upwardly through the spout 18. The curved leading wall of the spout portion 90 directs the material rearwardly through the discharge opening 92 and into the container 12.

The container top 14 has an inverted U-shaped configuration and comprises five equally spaced U-shaped support members 94 which have vertical leg portions extending upwardly in parallel relation to and inwardly of the walls 38 and 40 of the container 12. The members 94 are rigidly connected by means of a longitudinal brace 96 which extends between the upper ends of the vertical leg portions of the members. A rectangular sheet metal panel 98 is secured to the inner sides of the vertical legs of the members 94 below the brace 96, a curved sheet metal panel 100 extends between the curved portions of the second and fourth members 94 and is secured to the inner sides thereof, and curved sections of heavy gauge screen 102 and 104 extend between the first and second and fourth and fifth members 94, respectively, and are similarly secured to the inner sides thereof. The screen sections 102 and 104 allow excess air blown into the container by the unit 16 to escape. The top 14 further includes a rear door 106 which is pivoted along its upper edge at 108 and is swingable between a lowered position shown in the drawings and a generally horizontal position to permit removal of the completed stack from the container 12. A suitable mechanism for effecting such movement of the door 106 is disclosed in copending U.S. application, Ser. No. 371,734. As is apparent from the drawings, the sidewalls of the top are disposed just inwardly of the sidewalls of the container, and the rear door 106 of the top is disposed just inwardly of the rear door 50 of the container, so that the top is free to move vertically relative to the container between raised and lowered positions.

Mechanism connecting the top to the container and operative to move the top relative to the container between its raised and lowered positions is provided on each side of the implement. During the stack-forming process the top is normally maintained in its raised position, but from time to time the top is lowered to engage and compress the crop material that has accumulated in the container and thereby produce a more dense stack. The mechanism on the right side of the implement is a mirror image of that on the left side, and the ensuing description of the latter is thus analogously applicable to the former. The mechanism includes a pair of fore-and-aft, identical T-shaped crank members 110 pivotally mounted on the sidewall 40 for vertical swinging movement about horizontally coplanar, longitudinally spaced transverse axes. The front transverse axis is defined by a pin 112 which extends transversely between one of the vertical supports 42 and a vertical bar 114 which is disposed outwardly from and in spaced relation to the support. The lower end of the bar 114 is connected to the outer end of a cylindrical spacer 116 which is, in turn, connected to the outer side of the frame member 22, and the upper end of the bar is connected to a tapered brace 118 which is fixed to the upper portion of the support. Similarly, the rear transverse axis is defined by a pin 120 which extends transversely between another of the vertical supports 42 and a vertical bar 122 which is disposed outwardly from and in spaced relation to the support. The lower end of the bar 122 is connected to the outer end of a second cylindrical spacer similar to the spacer 116 and the upper end is connected to a second tapered brace 124 fixed to the upper portion of the support. A support 126 extends longitudinally between the upper ends of the vertical bars 114 and 122, in spaced relation to the wall 40. A horizontal link 128 interconnects the lower ends of each of the cranks 110 and acts to maintain the cranks in parallel relationship at all times, and a pair of fore-and-aft vertical links 130 and 132, respectively, connect the upper ends of the cranks with fore-and-aft pins 134 and 136, respectively, on the longitudinal brace member 96. Completing the mechanism is a hydraulic cylinder 138 which extends longitudinally between the vertical bar 114 and its adjacent vertical support member 42, and connects a bracket 140 fixed to the side of the channel member 26 and a bracket 142 on the front crank member 110. The cylinder is connectable through means not shown with the hydraulic system on the tractor used to tow the implement and is extensible and retractable to pivot the front crank 110 about the pin 112. Movement of the front crank is transferred to the rear crank by the horizontal link 128, and pivotal movement of each of the cranks is translated to vertical movement of the top by means of the vertical links 130 and 132.

The drive train for the pickup unit 16 includes a longitudinally extending shaft 144 adapted at its forward end (not shown) for connection to the power take-off shaft of the tractor employed to tow the implement, and supported at its rearward end in a right angle gearbox 146 which, in turn, is supported by conventional means on the backside of the transverse channel member 28. The shaft 144 is partially enclosed by a shield 148 and extends through an aperture (not shown) in the wall of the member 28. The gearing within the box 146 drives a transverse output shaft 150 which is supported at its right end in the box 146 and at its left end in a bracket 152 secured to the backside of the channel member 28. A first sheave 154 on the left end of the shaft 150 is connected by means of a belt 156 to a second sheave 158 on the left end of the pickup unit shaft 76 to complete the drive train for the pickup unit 16.

The drive train for the floor conveyor 56 includes three parallel, transverse shafts 160, 162 and 164 supported on the wall of the channel member 26, the forwardmost shaft 160 being disposed in axial alignment with the shaft 150 of the drive train for the pickup unit. A spur gear 166 on the outer end of the shaft 160 engages a spur gear 168 on the outer end of the shaft 162, and a second spur gear 170 on the shaft 162 just inwardly of the gear 168 engages a spur gear 172 on the shaft 164. Completing the drive train for the floor conveyor is a sprocket 174 on the outer end of the shaft 164 that is drivingly connected by means of a chain 176 to the sprocket 72 on the left end of the front floor conveyor shaft 58. Not shown for the sake of clarity in FIGS. 2-4 of the drawings is a sheet metal shield 178 (see FIG. 1) that normally encloses the gears on the shafts 160, 162 and 164.

Figure 3:
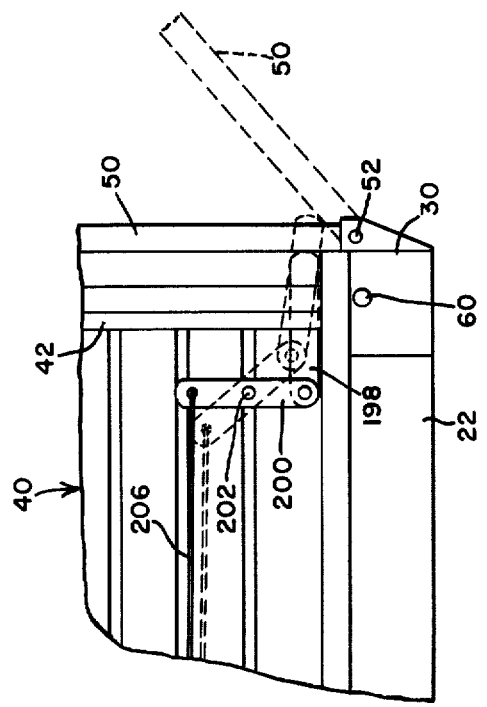
FIG. 3 is an enlarged fragmentary plan view of the invention.
Figure 4:
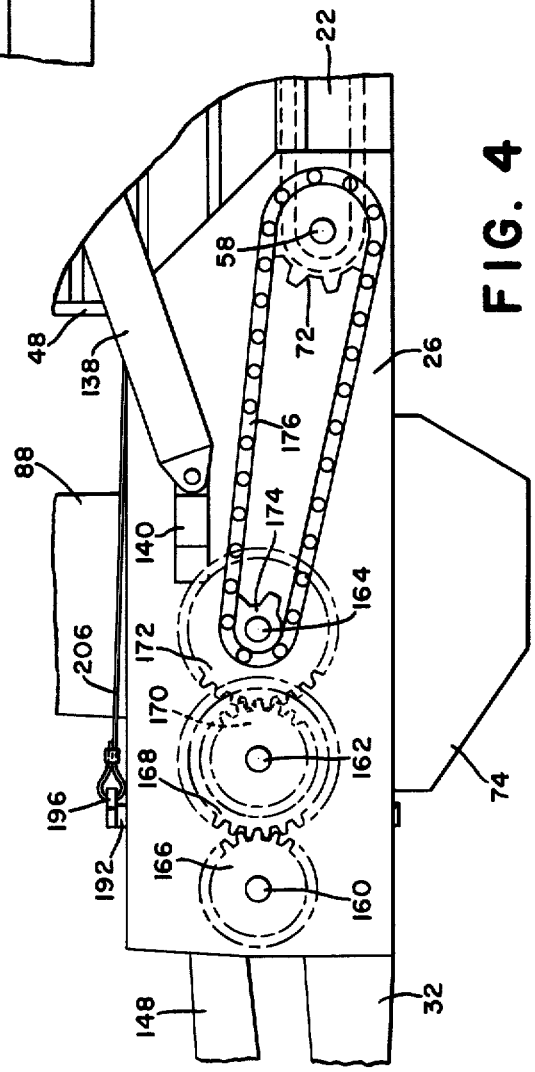
FIG. 4 is a left side elevational view of that portion of the invention shown in FIG. 3.

A clutch designated generally by the numeral 180 is operative to selectively connect the floor conveyor drive train to the pickup unit drive train to drive the floor conveyor while the pickup unit is being driven. The clutch includes a first element 182 which is fixed to the extreme left end of the shaft 150 and a second, mating element 184 which is axially slidable on the shaft 160 into and out of engagement with the element 182. The control mechanism that will now be described is operative to engage the clutch 180 and thereby drivingly connect the tractor power takeoff shaft to the floor conveyor 56, in response to movement of the rear door 50 from its closed to its opened position, and conversely to disengage the clutch, and thereby break the drive to the floor conveyor, in response to movement of the door from its opened to its closed position. The mechanism includes a yoke member 186 that is received in a circumferential groove in the clutch element 184, the yoke member including a cylindrical projection 188 on its upper side. The projection 188 extends through a slot in the forward end of an arm 190 which, in turn, is fixed at its rearward end to a vertical shaft 192. The shaft 192 is rotatably supported at its upper and lower ends in brackets 194 on the upper and lower walls of the channel member 26. A second arm 196 is fixed to the extreme upper end of the shaft 192 and extends transversely outwardly therefrom. It will be appreciated, as illustrated in FIG. 3 of the drawings, that rotation of the shaft 192 will move the clutch element 184 axially on the shaft 160 into and out of engagement with the element 182.

The shaft 192 is rotated in response to movement of the rear door 50 through the medium of a clutch control member 198 supported on the lower rear corner of the sidewall 40 of the container 12. The member 198 is normally longitudinally disposed and includes a rear end that is engageable by the front side of the door 50, an intermediate portion that extends through an aperture formed in the support 42, and a forward end that is pivotally connected to the lower end of a pivot arm 200. The arm 200 is pivotally connected at 202 to the sidewall 40 of the implement.

A coil spring 204 is received on the shaft 160 and acts between the inner side of the channel member 26 and the clutch element 184 to bias the latter inwardly toward the clutch element 182. The biasing force of the spring is transmitted through a cable 206 that interconnects the outer end of the arm 196 with the upper end of the arm 200, to also bias the clutch control member 198 against the front side of the door 50. As illustrated in the drawings, the parts are so arranged that when the door 50 is closed, the clutch element 184 is maintained in its disengaged position, but as the door is opened the member 198 is free to follow it rearwardly and thereby permit the clutch element 184 to move into engagement with the element 182. As the door 50 is returned to its closed position, it once again engages the control member 198 and forces it forward, which, through operation of the arms 200 and 196 and cable 206, causes the vertical shaft 192 to rotate and move the element 184 axially out of engagement with the element 182.

I claim:

1. A crop-harvesting machine comprising: a mobile frame; a crop container carried by the frame and including a rear opening; a door mounted at the rear of the container for movement into and out of closing relationship with the rear opening; a power driven crop conveyor in the container for moving crop material rearwardly from the container through the rear opening when the door is moved out of closing relationship therewith; power driven crop-handling means supported on the frame forwardly of the container for picking up crop material and delivering it rearwardly into the container as the machine is advanced through a field; first power train means for transmitting power from a power source to the crop-handling means; second power train means for transmitting power to the crop conveyor; clutch means engageable to drivingly connect said first and second power train means and thereby drivingly connect the power source to the crop conveyor; and means operatively connecting the door and the clutch for engaging the latter in response to movement of the former out of closing relationship with the opening, and for disengaging the clutch in response to movement of the door into closing relationship with the opening.

2. A crop-harvesting machine comprising: a mobile frame; a crop container carried by the frame and including a rear opening; a door mounted at the rear of the container for movement into and out of closing relationship with the rear opening; a power driven crop conveyor in the container for moving crop material rearwardly from the container through the rear opening when the door is moved out of closing relationship therewith; power driven crop-handling means supported on the frame forwardly of the container for picking up crop material and delivering it rearwardly into the container as the machine is advanced through a field; first power train means for transmitting power from a power source to the crop-handling means; second power train means for transmitting power to the crop conveyor; clutch means engageable to drivingly connect said first and second power train means and thereby drivingly connect the power source to the crop conveyor; a clutch control member connected to the clutch and mounted on the container for movement between clutch engaged and clutch disengaged positions; means biasing the control member toward its clutch engaged position; the control member being engaged by the door and maintained in its clutch disengaged position when the door is in closing relationship with the opening, and the member being free to move to its clutch engaged position when the door is moved out of closing relationship with the opening.

3. The invention defined in claim 2 wherein the crop-handling means includes a transverse shaft having a rotary drive element on one end; wherein the first power train means comprises a longitudinal shaft supported on the frame and adapted at its forward end for attachment to a power source in the form of a tractor power take-off shaft, a transverse shaft supported on the frame forwardly of the crop-handling means and having inner and outer ends, right angle drive means connecting the rear end of the longitudinal shaft and the inner end of the transverse shaft, a rotary drive element on the outer end of the transverse shaft, disposed in fore-and-aft alignment with the rotary drive element on the outer end of the crop-handling means transverse shaft, and an endless flexible element drivingly connecting said aligned rotary drive elements; wherein the second power train means includes a transverse shaft disposed outwardly from and axially aligned with the transverse shaft of the first power train means; and wherein the clutch means includes an element on the outer end of the transverse shaft of the first power train means engageable with an element on the inner end of the transverse shaft of the second power train means.

4. The invention defined in claim 3 wherein the crop conveyor means includes a transverse shaft having a rotary drive element on one end; and wherein the second power train means includes a gear speed reduction unit driven by the transverse shaft of the second power train means and an endless flexible element drivingly connecting the gear reduction unit with the rotary drive element on the crop conveyor transverse shaft.

5. The invention defined in claim 2 wherein the first power train includes a shaft, the second power train includes a shaft axially aligned with the first power train shaft, the clutch means includes a pair of engageable elements, one on each of said shafts, one of the elements being axially slidable on its shaft into and out of driving engagement with the other element, and wherein said biasing means comprises a coil spring axially aligned with and encircling one of the shafts for biasing the axially slidable element toward engagement with the other element.

6. The invention defined in claim 5 including a first lever on the forward end of the machine connected to the axially slidable clutch element for controlling movement thereof into and out of engagement with the other element, a second lever on the rear end of the machine connected to the clutch control member and movable in response to movement of the control member between its clutch engaged and clutch disengaged positions, and longitudinally extending cable means connecting the second lever to the first lever for moving the latter in response to movement of the former.

* * * * *